US 6,725,124 B2

(12) United States Patent
Yan

(10) Patent No.: US 6,725,124 B2
(45) Date of Patent: Apr. 20, 2004

(54) SYSTEM AND METHOD FOR TEXTURE MAPPING 3-D COMPUTER MODELED PROTOTYPE GARMENTS

(76) Inventor: He Yan, 2205 New Garden Rd. Apartment 3216, Greensboro, NC (US) 27410

( * ) Notice: Subject to any disclaimer, the term of this patent is extended or adjusted under 35 U.S.C. 154(b) by 0 days.

(21) Appl. No.: 10/281,620

(22) Filed: Oct. 28, 2002

(65) Prior Publication Data

US 2003/0074099 A1 Apr. 17, 2003

Related U.S. Application Data

(63) Continuation-in-part of application No. 09/658,730, filed on Sep. 11, 2000, now Pat. No. 6,473,671.

(51) Int. Cl.[7] .......................... G06F 17/50; G06F 17/00; G06T 17/00
(52) U.S. Cl. ........................................ 700/132; 345/581
(58) Field of Search ................................. 700/132, 130; 345/581; 382/154, 285

(56) References Cited

U.S. PATENT DOCUMENTS 4,888,713 A * 12/1989 Falk ........................... 345/582
6,456,287 B1 * 9/2002 Kamen et al. ............... 345/427
6,546,309 B1 * 4/2003 Gazzuolo .................... 700/132

OTHER PUBLICATIONS

U4ia® euphoria—4.3 Reference Manual, vol. 2—Computer Design, Inc.

* cited by examiner

*Primary Examiner*—Peter Nerbun
(74) *Attorney, Agent, or Firm*—Smith Moore LLP

(57) ABSTRACT

A system and method for texture mapping in a computer-aided design and automation system for mass customization. The system includes a 3-D body model and a virtual prototype model. A grid is drawn or printed on a fabric and the fabric is draped on a body. Photographs are then taken of the garment and entered into the system. A picture converter generates views of the garment from different angles and stores the pictures in a picture database. The grid lines on the fabric provide information on the flow of the fabric on the body. The picture converter converts the grid lines into the control line information that is stored in a 3-D library. This control line information enables subsequent accurate and consistent texture mapping. In the preferred embodiment, the texture mapping is based on a textile design database, which may be created from a fabric swatch or by textile design.

18 Claims, 5 Drawing Sheets

SYSTEM AND METHOD FOR TEXTURE MAPPING 3-D COMPUTER MODELED PROTOTYPE GARMENTS

This is a continuation-in-part of application Ser. No. 09/658,730, filed Sep. 11, 2000, U.S. Pat No. 6,473,671.

BACKGROUND OF THE INVENTION

(1) Field of the Invention

The present invention relates generally to computer-aided design and manufacturing and, more particularly, to a system and method for texture mapping a computer modeled prototype garment.

(2) Description of the Prior Art

Computer automation has played an important role in the apparel industry. For example, it makes mass customization possible in a quick-turn environment. Body scanning is a major component of the automation, which has been studied over the past several years and has met with some success. Body scanning can produce useful information for developing CAD functionality in product development and pre-production, from design conceptualization to marker making.

One of the important applications of body scanning is measurement extraction. Compared to traditional tape measures, measurement extraction provides measurements that are more accurate in a much more efficient way. In addition to obtaining body measurements accurately and efficiently, one also needs to master short-cycle with flexible manufacturing, and provide virtual try-on and digital printing capabilities. Digital printing allows manufacturers to print fabric for individual garments.

These elements of mass customization make it difficult for any attempt to automate the garment designing process. A number of companies in the apparel supply chain have tackled this problem with limited success. Several mass customizing models are currently in use. For example, Brooks Brothers developed an integrated information system, called e-Measure, to allow customers to create and visualize 25 different made-to-measure suit silhouettes in 300 to 500 fabrics. For each new suit order, the body measurements, including the chest, waist and over arm, are taken and entered into the e-Measure system. Only a fixed set of patterns stored in the system can be applied to an individual, although certain standardized alterations are available. A drawback of this system is that it does not match patterns to body scanning. The limited measurements obtained are not sufficient to represent customers' unique size information. As a consequence, more alterations may be needed after the garment is made.

Eastman Machine Co. offered a system using a body scanning technology through a partnership with TELMAT and ScanVec Garment Systems. It created a 3-D image of an individual's body shape from 70 different measurements. It then used the measurement information to modify a pattern and create a cut file that is sent directly to the cutter. A drawback of this system is that it does not provide any 3-D catalog of styles and fabrics for customers' choices.

Gerber Technology Inc. offers the APDS-3D pattern visualization software on its AccuMark systems. APDS-3D is a virtual draping and sampling program that can transfer a 2-D flat pattern to a 3-D virtual dress form. It is now used merely as a visual tool. If the dress form can be created from actual customer body measurements, it is possible for the system to be further developed as a tool to test fitting results. In addition, the design is limited to close fitting styles.

Several CAD vendors, such as Gerber Technology and Lectra, also offer software programs with texture mapping functions. When performing a texture mapping process using one of these prior art systems, a user first scans in a 2-D picture of the garment draped on a body (referred to as the "object"). The user then draws control lines to define the boundary of the object and follows the drape and bend of the original image's fabric to draw additional control lines to indicate the fabric pattern flow. The user then designs the fabric pattern or calls certain fabric pattern design to process texture mapping. A drawback of these texture mapping systems is that the user can only see the object from only one angle, which is typically the front view. Also, it is very time consuming to draw control lines and users have to draw control lines for all the different pictures. Finally, it is difficult to define the pattern flow accurately. For the same object, different users can have different definitions of pattern flow, and the same user can define the pattern flow of the same object differently at different times. Furthermore, typically a beginning learner makes drawing errors especially on more complicated objects. Therefore, these programs lack consistency and accuracy.

Currently there are two ways of generating slopers. First, patternmakers draft on hard paper and later enter the block (i.e. sloper) using a digitizer that converts the hard pattern into a computerized format. Second, patternmakers can use a pattern design system (PDS) to draft the sloper on the computer. The problem with both methods is that drafting is very time consuming, therefore only a few slopers are made for standard size target customers.

Patternmakers now make changes in the pattern or sloper through CAD software on-screen using standard flat patternmaking techniques, including dart manipulations, add fullness, etc. This is also very time consuming. In addition, the fitting result cannot be seen until the patterns are cut and sewn into prototype garments, which would be tried on a real model. Finally, the process of making a prototype garment is expensive and time consuming, too.

Thus, there remains a need for a new and improved apparatus and method for automation of custom garments for a specific individual's needs, which creates a virtual prototype model of the garment using a 3-D library database with sloper information created from formulas of generating different slopers and using accurate and consistent texture mapping. This would allow the designer to generate the sloper automatically such that the pattern style information (i.e. pattern generating process) is used to generate the pattern database for a customer's individual body measurements.

SUMMARY OF THE INVENTION

The present invention is directed towards a system for texture mapping a virtual prototype model in a system for computer-aided design and automation of mass customization. The system for texture mapping includes a fabric having a grid that is based on grain lines in the warp and weft directions of the fabric. The grid, which is preferably a substantially square grid, may be printed, drawn, or woven into the fabric. The system further includes a picture database comprising at least one photograph of the fabric draped on a body and a picture converter that converts the image of the grid on the fabric in the photograph into control line information that defines the flow of the fabric on the body. The control line information is used to perform texture mapping on the virtual prototype model and the control line information is stored in a 3-D library. The texture mapping may be performed using a textile design database that is created from a fabric swatch or by textile design.

In a preferred embodiment, the grid lines may be cleared from the photograph in the picture database using image processing. The control line information can be retrieved from the 3-D library by a subsequent user and at a subsequent time. The 3-D library preferably comprises information relating to close fitting styles and loose fitting styles.

Another aspect of the present invention is to use the control line information to perform texture mapping to create a loose fitting style virtual prototype model and a close fitting style virtual prototype model.

Still another aspect of the present invention is to provide a method for texture mapping on a virtual prototype model in a system for computer-aided design and automation of mass customization. The method includes the steps of draping a fabric having a grid on a body, photographing at least one view of the fabric on the body, storing the photograph in a picture database, generating control line information from the grid to describe the flow of the fabric on the body, storing the control line information in s 3-D library, and texture mapping the virtual prototype model using the control line information.

These and other aspects of the present invention will become apparent to those skilled in the art after a reading of the following description of the preferred embodiment when considered with the drawings.

DESCRIPTION OF THE PREFERRED EMBODIMENTS

Figure 1:
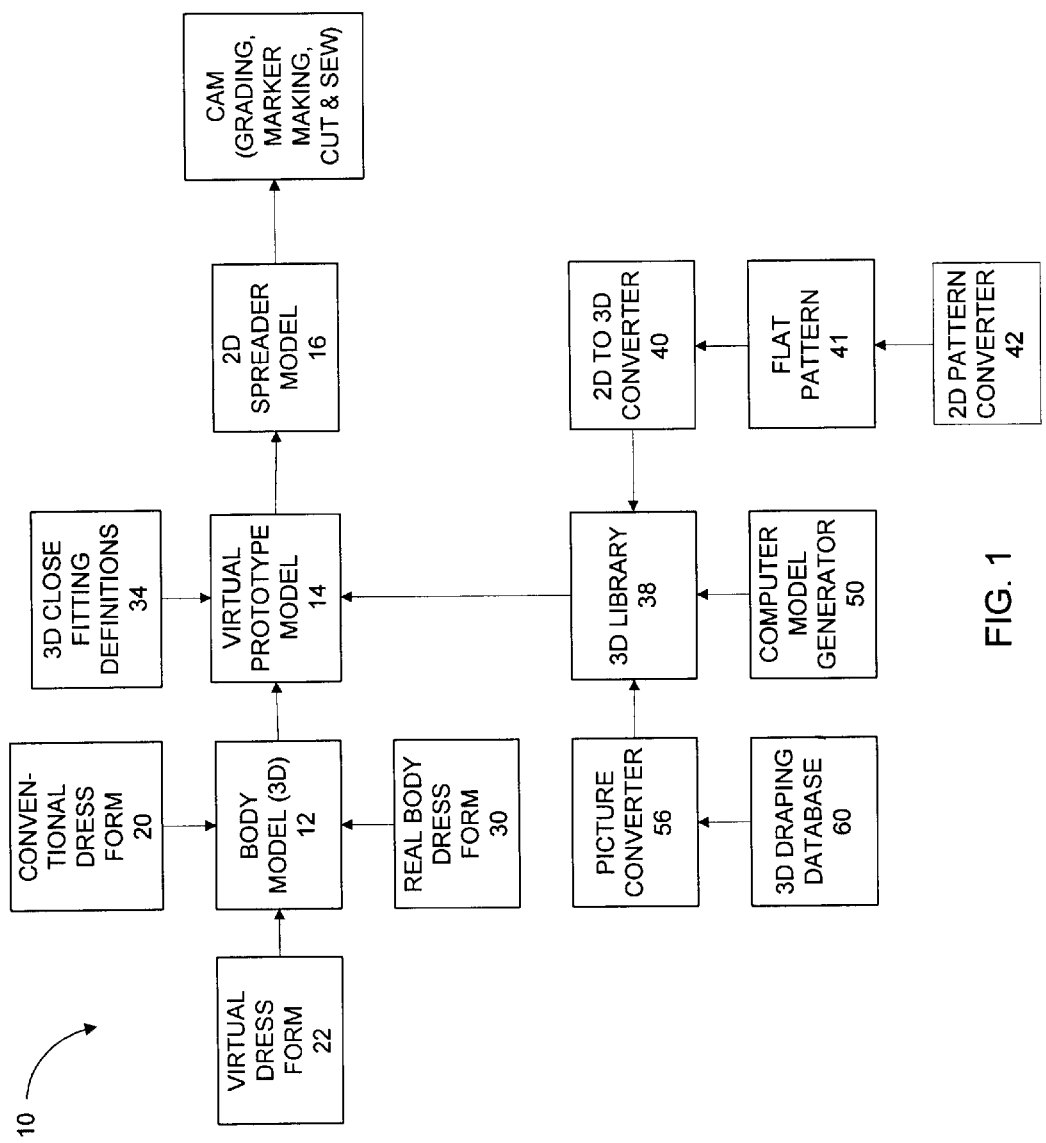
FIG. 1 is an overall schematic of a system for 3-D computer-aided apparel designs.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

As best seen in FIG. 1, a system for 3-D computer-aided apparel design, generally designated 10, is shown constructed according to the present invention. The system 10 includes three primary components: a 3-D body model 12, a virtual prototype model 14 with pattern information, and a 2-D spreader model 16. Output from the 2-D spreader model 16 may be used for grading, markermaking, cutting and sewing a finished garment, as will be described in more detail later.

Figure 3:
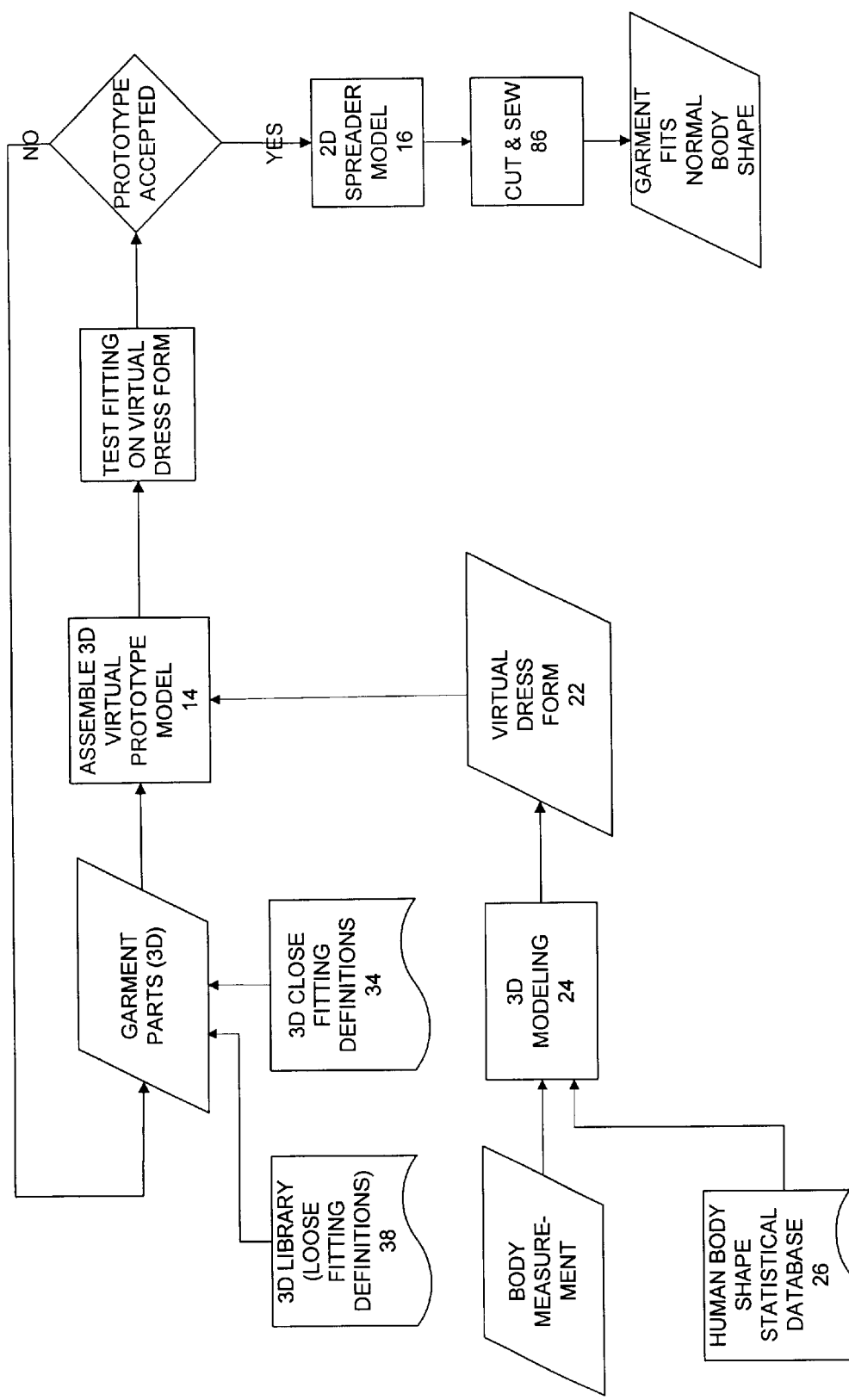
FIG. 3 illustrates simulation of draping using a virtual dress form.
Figure 4:
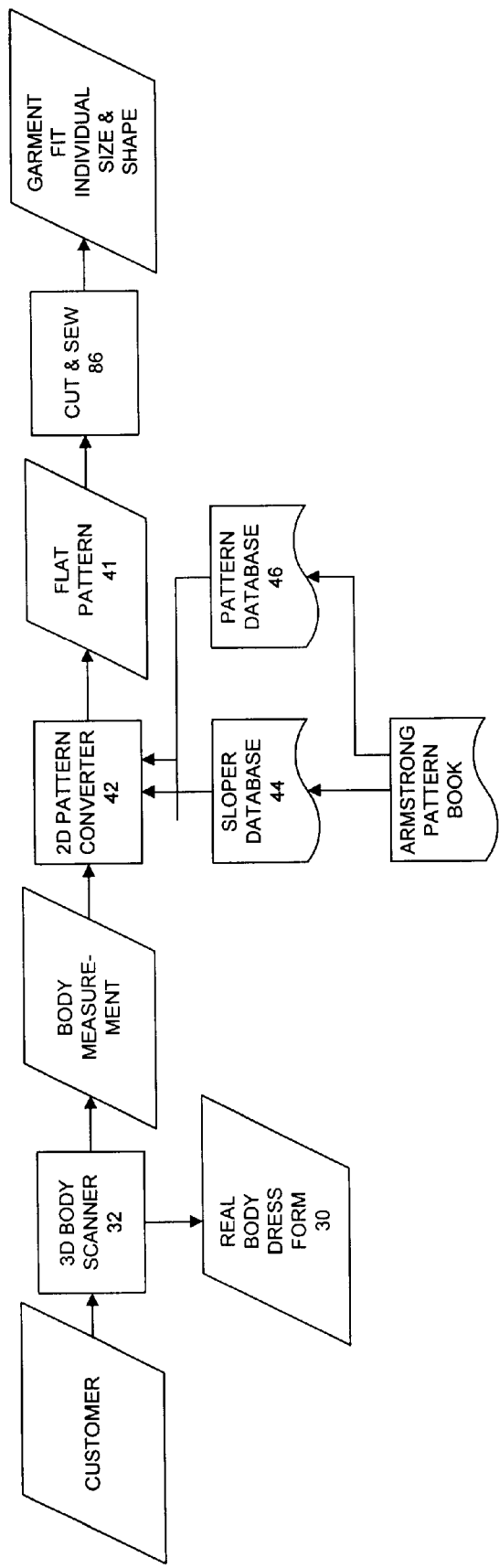
FIG. 4 illustrates simulation of draping using a true body dress form.

3-D body model 12 may receive input from a conventional dress form 20 (see FIG. 2); a virtual dress form 22 (see FIG. 3); or a true body dress form 30 (see FIG. 4). The output of the 3-D body model 12 is sent and creates the virtual prototype 14. Virtual prototype 14 receives the pattern design information from either 3-D close fitting definitions 34 or 3-D library 38 that may include information on both loose and close fitting definitions, as best seen in FIG. 3. The close fitting definitions define the degree to which a garment drapes or fits closely to the body. Similarly, the loose fitting definitions define the degree to which a garment fits loosely on the body.

The close and loose fitting definitions stored in 3-D library 38 are processed by the 2-D pattern converter 42 into a flat pattern 41 and then converted into the 3-D garment part by the 2-D to 3-D converter 40. In addition, the close and loose fitting definitions stored in 3-D library 38 may be generated by computer model 50. Finally, close and loose fitting definitions stored in 3-D library 38 may also be obtained by using 3-D draping database 60 to create 3-D pictures, which can be passed through a picture converter 56 to generate picture database 54 which provides data for texture mapping, as discussed in more detail below. While the 3-D pictures could be produced by 3-D scanning of the garments, most designs are usually distributed in a 2-D format. In addition, having front and back views normally should be sufficient to convey the design concept and allow a 3-D garment to be simulated.

The output of the virtual prototype, which shows a simulation of the design on a 3-D body model, may also be sent to the 2-D spreader model 16. The 2-D spreader model 16 can then generate patterns which can be used to produce a unique garment, create grading for a multiplicity of garments and finally, even to create and manufacture many different sizes or many different numbers of the same garment.

As can be appreciated, the virtual prototype 14 of the present invention not only includes a visual representation, but also includes both the pattern information unique to the garment and the individual that the garment is sized for.

This pattern information can then be used to generate the pattern pieces to fit individual body size and shape, so the customer does not have to go to the department store to buy those commercial patterns or take a lot of time to do the alterations. Instead, they will get the pattern that will fit their individual body shape and size directly.

Figure 2:
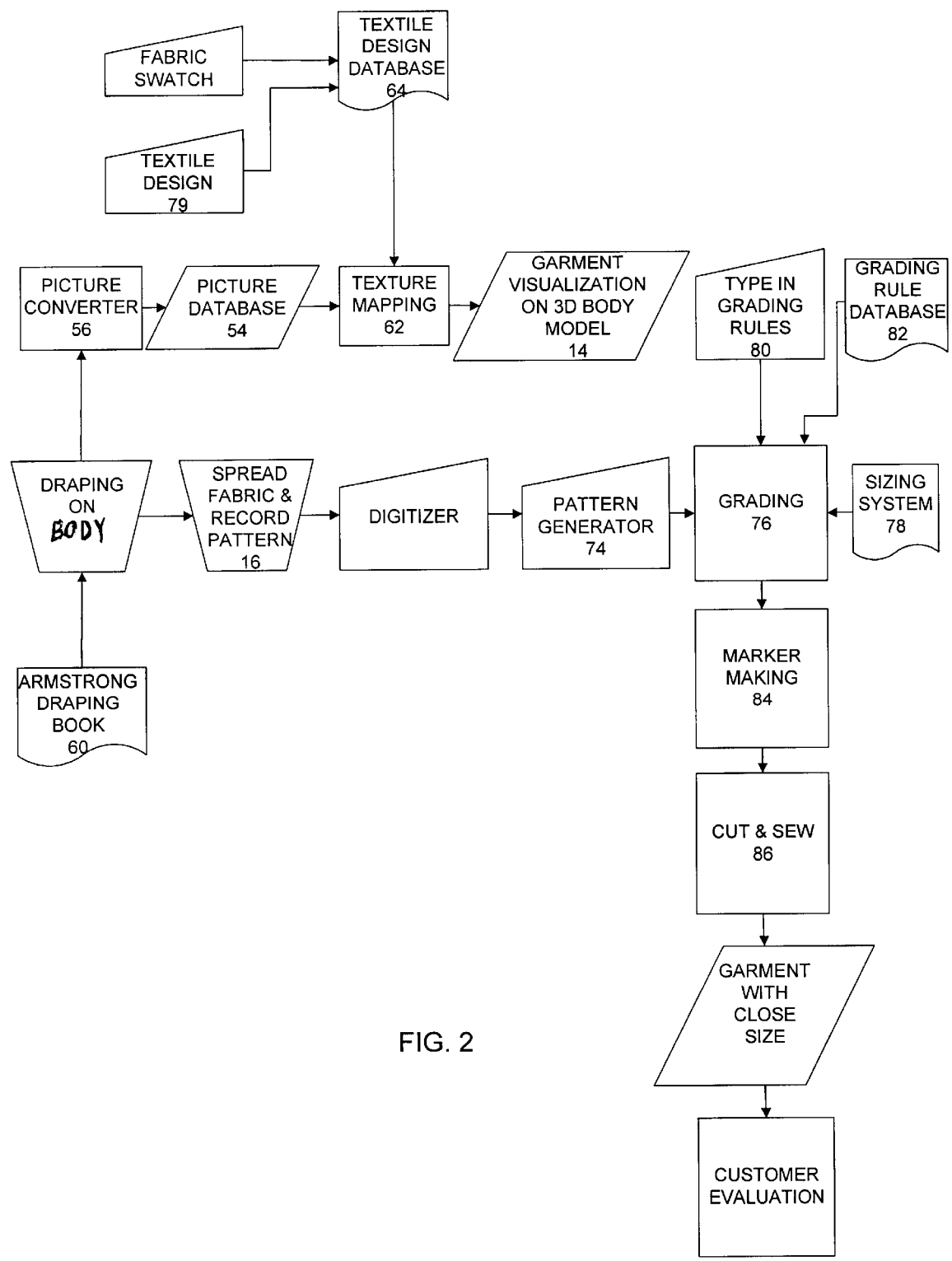
FIG. 2 illustrates simulation of draping with a conventional dress form and forming the pattern.

Turning to FIG. 2, there is shown a simulation of draping with the conventional dress form body or human body and then forming the pattern. The designer first finds the grain lines on the fabric in both the warp and weft directions. These grain lines are used as the basis for drawing a grid on the fabric, which is preferably a substantially square grid. In an alternative embodiment, the fabric may already have a grid printed on or woven into it. The designer then drapes the fabric on the dress form body or human body using, for example, the Armstrong Draping book. Once the fabric is draped on the body, the designer takes pictures of the garment from different angles using a 3-D scanner or camera to simulate a 3-D result. Picture converter 56 then generates a picture database 54, which stores the pictures of the garment from different angles. Unlike the prior art methods for performing texture mapping, the grid lines shown in the pictures of the garment accurately describe the flow of the fabric on the dress form.

In a preferred embodiment, the picture converter 56 converts the image of the grid lines on the fabric, as shown in the pictures stored in the picture database 54, into control line information. In an alternative embodiment, the user draws the control lines using the grid as a template and this information is processed by the picture converter 56.

The control line information describes the flow of the fabric so it enables subsequent accurate and consistent texture mapping 62. Specifically, the user can texture map 62 a fabric design for that garment and assemble the garment parts from the various angles to get ideal visual results in a 3-D simulation of the virtual prototype model 14. The designs for the texture mapping may come from a textile design database 64 or may be created by using a fabric swatch 66 or a textile design program 70. The forgoing process for texture mapping may be utilized for both loose fitting and close fitting garments.

The information regarding the control lines of the garment may be stored in the 3-D library 38 for future use. For example, the user can later retrieve the control line information on the garment from various angles such as front, back, side, top, and bottom. Therefore, the user does not have to spend the time drawing control lines to define the fabric flow and worrying about making mistakes. Further, the control lines that are generated are accurate and consistent no matter who uses them and at what time. After the information on the control lines is stored in the 3-D library 38, the grid lines on the pictures can be cleared through image processing for a more aesthetically pleasing presentation to the client and stored in the picture database 54.

The actual forming of the pattern is done from the draping on the dress form by spreading the fabric record pattern information 16. A digitizer may then be used to create the pattern generator 74, which may include adding seam allowance or transferring darts. This pattern information may, in the preferred embodiment, go through a grading generator 76. Grading generator 76 may either use manual entry 80 of typing in the grading rules, or may use an automatic grading base 82. The grading generator further includes a sizing system 78, which are rules by which various sizes of a particular pattern are adjusted. Once the output of the grading generator can, in the preferred embodiment, go directly to a marker maker 84, it can be received by a cut and sew operator 86 to complete a custom garment.

In this process, if the garment is based on the conventional dress form body, then the garment fits the normal body shape. After the grading process, it is produced as a different size of the garment, but it is based on the sizing system of the individual company. On the other hand, if the garment is based on the human body of an individual, then the garment fits that individual's human body shape.

FIG. 3 illustrates a simulation of draping using a virtual dress form. In this method, the designer first inputs certain known body measurements. 3-D modeling 24 then creates a virtual dress form 22 for a normal human body, male or female, with these measurements and statistical database 26. This data is inputted, along with the 3-D garment parts, from the 3-D library 38 and 3-D close fitting definition 34 to create the virtual prototype model 14.

In the preferred embodiment, an additional step of test fitting of the virtual prototype includes checking sleeve fitting on the arm holes; the bodice fitting on the neckline; the skirt fitting on the waist; and the front, back, and side views to verify that the virtual prototype is fitted properly. If the test fitting is not met, the 3-D garment parts are recreated and tested again on the virtual prototype model 14.

Once a virtual prototype is acceptable, it may go to the 2-D spreader model, such as discussed in FIG. 2, for final cut and sew. However, if the 3-D garment part is generated from the 2-D pattern, it is already flat and does not need to be spread again. On the other hand, the system shown in FIG. 3 started with body measurements and statistical database for human body shape, through 3-D modeling algorithms, a virtual dress form is generated. Since the virtual dress form is based on the statistics of the human body shape, it represents the "normal" body shape. How accurately it represents an individual body, depends on how many measurements are entered.

Turning now to FIG. 4, there is illustrated a simulation of draping using a true body dress form. In this embodiment, a customer is first passed through a 3-D body scanner 32. The 3-D body scanner may produce an actual 3-D dress form of an individual size and shape 30. In addition, specific body measurements are sent to the 2-D pattern converter 42. Pattern converter 42 receives input from sloper database 44 and receives input from pattern database 46, and may further include input from the Armstrong patternmaking book. This data is used to produce the flat pattern design 41. In the prior art method, the sloper is first drafted and is put on hard paper, and then later digitized to be used over-and-over again to produce the flat pattern design method based on the Armstrong patternmaking book. However, in the present invention, a sloper database is used to create this information for the 2-D pattern converter 42, which saves substantial time. After the 2-D pattern is generated, the pattern may, such as discussed in FIG. 2, go to a conventional cut and sew operation 86 to produce a garment of that individual size.

In the past, manufactures have had to enter the sloper input data into the computer first and then manipulate the information into the pattern piece. In the present invention, the pattern database allows the designer to input the manipulation procedure information, so they save time on pattern generation (i.e. transfer dart, add seam allowance, or to add fullness, etc).

Figure 5:
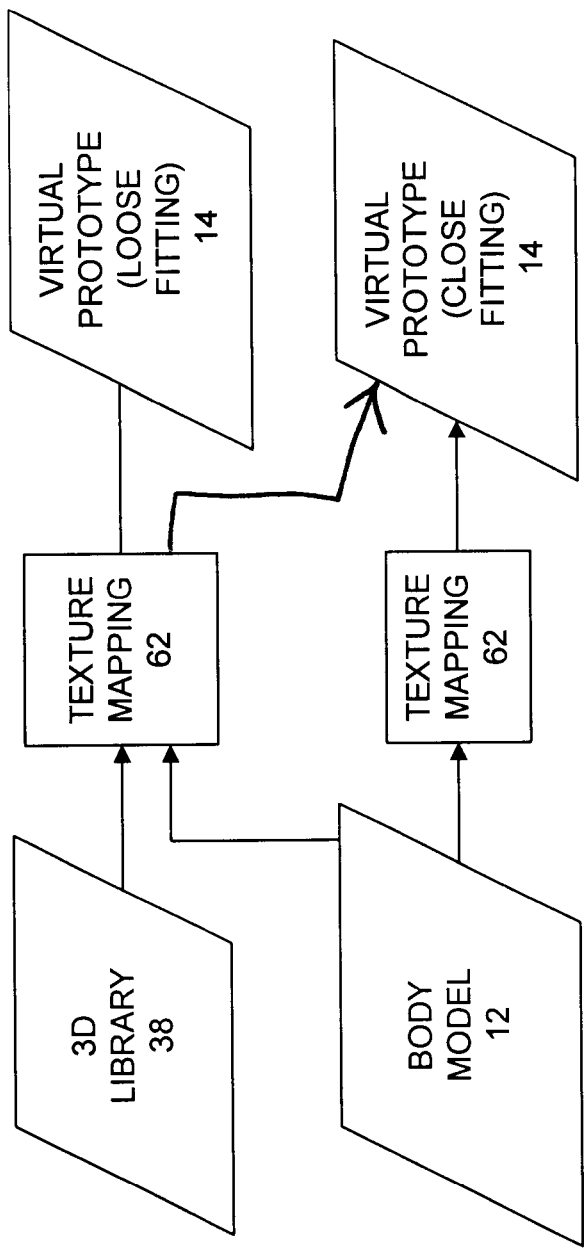
FIG. 5 illustrates texture mapping of the virtual prototype model.

FIG. 5 illustrates texture mapping on the virtual prototype model 14. In one embodiment relating to close fitting styles, this is begun with a body model 12. The close fitting style for the simulation can then can go through the texture mapping of the dress form by texture mapping 62 directly on the body model 12 to produce the close fitting style virtual prototype 14. In another embodiment, which may be applied to both close fitting and loose fitting styles, the design is generated from the 3-D library 38, which may already include information on the control lines, as described above. Texture mapping is performed as described in more detail above and is fitted on the body model 12 to produce the loose fitting style virtual prototype 14 and/or close fitting style virtual prototype 14.

In operation, formulas of generating different slopers are used to create a sloper database. When the customer's individual body measurement information is entered, the computer will generate the sloper database automatically. In the preferred embodiment, style information (i.e. pattern generating process) is used to generate a pattern database. Thus, the designer can simply retrieve the style from the database and change some parameters if necessary. The 3-D library of the present invention may be used to provide thousands of styles for a designer or customer to choose. The designer can also add their own design to the library.

For the visual result, the present invention can be used to combine real pictures of draping results, 3-D computer modeling technique and texture mapping to generate 3-D virtual prototype garments. At the same time, the present invention can "spread" and record 2-D pattern information. When a designer retrieves certain styles from the 3-D library, they get pattern information as well.

Designers and customers can use the system constructed according to the present invention from a distance. For example, customers can get their body measurement information through a body scanner. The information can be saved on disk or smart card and sent to a designer or manufacturer via the Internet. Customers can choose the style, color, and fabric they prefer to fit his/her individual body shape. Eventually, they can see themselves wearing the garment of their choice on the screen from different angles, under different light sources, with different backgrounds.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A system for texture mapping on a virtual prototype model in a system for computer-aided design and automation of mass customization, said system for texture mapping comprising:

a fabric having a grid;

a picture database comprising at least one photograph of the fabric draped on a body; and a picture converter that converts the image of the grid in the photograph stored in the picture database into control line information that defines the flow of the fabric on the body;

wherein the control line information is used to perform texture mapping on the virtual prototype model; and wherein the control line information is stored in a 3-D library.

2. The system for texture mapping according to claim 1, wherein the grid is based on grain lines in the warp and weft directions of the fabric.

3. The system for texture mapping according to claim 2, wherein the grid is a substantially square grid.

4. The system for texture mapping according to claim 1, wherein the grid is drawn on the fabric.

5. The system for texture mapping according to claim 1, wherein the grid is printed on the fabric.

6. The system for texture mapping according to claim 1, wherein the grid is woven into the fabric.

7. The system for texture mapping according to claim 1, further comprising a 3-D draping database that defines how the fabric is draped on the body.

8. The system for texture mapping according to claim 1, wherein the photograph of the fabric draped on the body is taken with a 3-D scanner.

9. The system for texture mapping according to claim 1, wherein the photograph of the fabric draped on the body is taken with a camera.

10. The system for texture mapping according to claim 1, wherein the texture mapping is performed using a textile design database.

11. The system for texture mapping according to claim 10, wherein the texture design database is created from a fabric swatch.

12. The system for texture mapping according to claim 10, wherein the texture design database is created by textile design.

13. The system for texture mapping according to claim 1, wherein the grid may be cleared from the at least one photograph in the picture database through image processing.

14. The system for texture mapping according to claim 1, wherein the control line information may be retrieved from the 3-D library by a subsequent user and at a subsequent time.

15. The system for texture mapping according to claim 1, wherein the 3-D library includes information relating to close fitting styles and loose fitting styles.

16. The system for texture mapping according to claim 1, wherein said 3-D library is generated by a computer model.

17. A system for texture mapping on a virtual prototype model in a system for computer-aided design and automation of mass customization, said system for texture mapping comprising:

a fabric having a grid;

a picture database comprising at least one photograph of the fabric draped on a body; and a picture converter that converts the image of the grid in the photograph stored in the picture database into control line information that defines the flow of the fabric on the body;

wherein the control line information is stored in a 3-D library comprising loose fitting information that defines a degree to which a garment fits loosely on a body and close fitting information that defines a degree to which garments fit loosely on a body; and wherein the control line information is used to perform texture mapping to create a loose fitting style virtual prototype model and a close fitting style virtual prototype model.

18. A method for texture mapping on a virtual prototype model in a system for computer-aided design and automation of mass customization, said method comprising the steps of:

(a) draping a fabric having a grid on a body;

(b) photographing at least one view of the fabric on the body;

(c) storing the photograph in a picture database;

(d) generating control line information from the grid that describes the flow of the fabric on the body;

(e) storing the control line information in a 3-D library; and (f) texture mapping the virtual prototype model using the control line information.

* * * * *